(12) United States Patent
Fioravanti

(10) Patent No.: US 6,212,029 B1
(45) Date of Patent: Apr. 3, 2001

(54) SNUBBER FOR A DISC DRIVE

(75) Inventor: Louis J. Fioravanti, Edmond, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/183,585

(22) Filed: Oct. 30, 1998

Related U.S. Application Data
(60) Provisional application No. 60/075,793, filed on Feb. 24, 1998.

(51) Int. Cl.[7] .................................................. G11B 17/02
(52) U.S. Cl. ............................................. 360/97.01
(58) Field of Search ........................... 360/97.01–99.12

(56) References Cited

U.S. PATENT DOCUMENTS

| | | |
|---|---|---|
| 3,713,121 | 1/1973 | Fasano et al. . |
| 4,703,376 | 10/1987 | Edwards et al. . |
| 4,843,503 | 6/1989 | Hazebrouck et al. . |
| 5,121,278 * | 6/1992 | Tanaka et al. ................. 360/133 |
| 5,140,478 | 8/1992 | Yoshida . |
| 5,231,556 | 7/1993 | Blanks . |
| 5,341,260 | 8/1994 | Jabbari . |
| 5,404,636 | 4/1995 | Stefansky et al. . |
| 5,422,770 | 6/1995 | Alt . |
| 5,453,891 | 9/1995 | Takemoto . |
| 5,483,398 | 1/1996 | Boutaghou . |
| 5,550,695 | 8/1996 | Matsumoto . |
| 5,581,424 | 12/1996 | Dunfield et al. . |
| 5,757,587 | 5/1998 | Berg et al. . |
| 5,764,437 | 6/1998 | Meyer et al. . |
| 5,801,899 * | 9/1998 | Gemheimer ................. 360/97.01 |
| 6,021,019 * | 2/2000 | Genheimer et al. ........... 360/97.01 |

FOREIGN PATENT DOCUMENTS

| | | |
|---|---|---|
| 404079085A | 3/1992 | (JP) . |
| 404188476A | 7/1992 | (JP) . |
| 408106743A | 4/1996 | (JP) . |

\* cited by examiner

*Primary Examiner*—Robert S. Tupper
(74) *Attorney, Agent, or Firm*—Crowe & Dunlevy

(57) ABSTRACT

A snubber for a plurality of discs in a disc drive has a pivoting body with extending portions having angled surfaces that abuttingly engage the discs in a closed position of the pivoting body, the angled surfaces alternatively clearingly disengaging the discs in an open position of the pivoting body. A spring member biases the pivoting body to the closed position, and a solenoid when electrically energized imparts an opposing rotational force to urge the pivoting body to the open position. In the closed position the angled surfaces provide a two-point contact in support of each disc, the surfaces supporting the disc on each side of the disc to provide a fixed support of the disc at the edge thereof.

1 Claim, 5 Drawing Sheets

SNUBBER FOR A DISC DRIVE

RELATED APPLICATIONS

This application claims the benefit of U.S. Provisional Application Ser. No. 60/075,793 entitled DISC PACK OUTER DIAMETER SNUBBER, filed Feb. 24, 1998.

FIELD OF THE INVENTION

The present invention relates generally to the field of disc drive data storage devices and more particularly, but not by way of limitation, to a snubber for supporting the outer edge of a data disc of the disc drive.

BACKGROUND OF THE INVENTION

Modern disc drives are commonly used in a multitude of computer environments, ranging from super computers to notebook computers, to store large amounts of data in a form that is readily available to a user. Typically, a disc drive has one or more magnetic discs that are rotated by a spindle motor at a constant high speed. Each disc has a data storage surface divided into a series of generally concentric data tracks that are radially spaced across a band having an inner diameter and an outer diameter. The data is stored within the data tracks on the disc surfaces in the form of magnetic flux transitions. The flux transitions are induced by an array of read/write heads. Typically, each data track is divided into a number of data sectors where data is stored in fixed size data blocks.

The read/write head includes an interactive element such as a magnetic transducer. The interactive element senses the magnetic transitions on a selected data track to read the data stored on the track. Alternatively, the interactive element transmits an electrical signal that induces magnetic transitions on the selected data track to write data to the track.

Each of the read/write heads is mounted to a rotary actuator arm and is selectively positioned by the actuator arm over a pre-selected data track of the disc to either read data from or write data to the data track. The read/write head includes a slider assembly having an air bearing surface that, in response to air currents caused by rotation of the disc, causes the head to fly adjacent to the disc surface with a desired gap separating the read/write head and the corresponding disc.

Typically, multiple center-open discs and spacer rings are alternately stacked on a spindle motor hub. The hub, defining the core of the stack, serves to align the discs and spacer rings around a common axis. Collectively the discs, spacer rings and spindle motor hub define a disc pack assembly. The surfaces of the stacked discs are accessed by the read/write heads which are mounted on a complementary stack of actuator arms which form a part of an actuator assembly. The actuator assembly generally includes head wires which conduct electrical signals from the read/write heads to a flex circuit which, in turn, conducts the electrical signals to a flex circuit connector mounted to a disc drive base deck.

When the disc drive is not in use, the read/write heads are parked in a position separate from the data storage surfaces of the discs. Typically, a landing zone is provided on each of the disc surfaces where the read/write heads are positioned before the rotational velocity of the spinning discs decreases below a threshold velocity which sustains the air bearing. The landing zones are generally located near the inner diameter of the discs.

The environment in which computers are used today is demanding. This is especially true for laptop computers which are often used while in transit. As a result, disc drives must function reliably under conditions of external shock and vibration. The external shock is quantified in terms of magnitude and duration, and disc drives are designed in accordance with specifications for operational and non-operational resistance to shocks.

Operational specifications address the levels of permissible shock while the drive is in operation. Low level shocks can cause the read/write heads to move off-track, resulting in data reading and writing errors. Non-operational specifications address the limits of shock due to handling and transit activities while the disc drive is non-operational. Non-operational shocks can cause damage to the read/write head and to the data discs.

There are at least four types of non-operational damage related to shock. Outer diameter portions of the data discs are damaged when the discs deflect and make contact with the actuator. Arm tip induced media damage can occur when the actuator arm deflects into the disc. Head induced media damage can occur when the heads impact the discs, either by the heads lifting off the media or by vibration propagating through the head arm after a shock.

Snubbers generally have been employed to limit the amount of deflection of disc drive components following a shock. Disc snubbers in particular are widely used to limit the amount of deflection of an outer edge of a disc in a disc pack. A common problem, however, with disc snubbers is associated with mechanical accumulation of tolerances. It is difficult to design a snubber which properly engages the discs through the range of mechanical tolerances which combine and stack among the numerous components in a disc drive. For example, the location of the discs is a function of base deck casting and machining tolerances, disc dimensions, top cover dimensions, spindle motor tolerances, and disc spacer dimensions. When all of these and other associated parts are joined, it is impossible to determine exactly where the edge of the disc will be located. This makes it difficult to properly position the disc snubber so as to effectively limit disc deflection.

The demand for ever-smaller disc spacings and ever-higher disc capacity has accelerated the long-felt need for a disc snubber that clearingly disengages the discs when the disc drive is operational, yet abuttingly engages the discs when the disc drive is non-operational, thus providing an improved fixed support of the disc edge to minimize deflection following an external shock.

SUMMARY OF THE INVENTION

The present invention is directed to a disc drive having a disc snubber for selectively engaging the discs of the disc drive to minimize a deflection of the disc resulting from an external shock or vibration imparted to the disc drive.

The disc snubber has a pivoting body that pivots between a first, or closed, position and a second, or open, position. An array of extending portions depend from the pivoting body, having angled surfaces which abuttingly engage the discs in the closed position of the pivoting body, and which furthermore clearingly disengage the discs in the open position of the pivoting body. In the closed position the abutting engagement of the angled surfaces provides a fixed support of the outer edge of the discs to minimize the deflection of the disc following an external shock or vibration.

The snubber has a coiled spring that operably engages and biases the pivoting body to the closed position. A solenoid, when electrically energized, opposingly urges the pivoting body to the open position against the force of the coiled spring.

A snubber constructed in accordance with the present invention provides a variable clearance between the engaging surfaces thereof and the discs. In an operable mode of the disc drive a clearance between the engaging surfaces and the spinning discs is maximized so that the discs clearingly disengage the snubber except in the event of a substantial shock that deflects a disc a significant amount. When the disc drive is powered down, the snubber operably manipulates the engaging surfaces to abuttingly engage each disc at points both above and below each disc in order to fixedly support the disc at the outer edge thereof. Because of the inherent uncertainty in the location of the disc edge due to mechanical tolerance stacking, a certain amount of elastic deflection is imparted to the disc. A semi-compliant material is also employed in the engaging surfaces so as to accommodate the part-to-part variation of the disc location.

The present invention provides an improved support for the edges of a plurality of discs forming a disc pack in a disc drive, thereby minimizing damage to the discs and other associated components following an external shock on the disc drive. These advantages and other features of the present invention will be apparent from the following description when read in conjunction with the drawings and appended claims.

DETAILED DESCRIPTION

Figure 1:
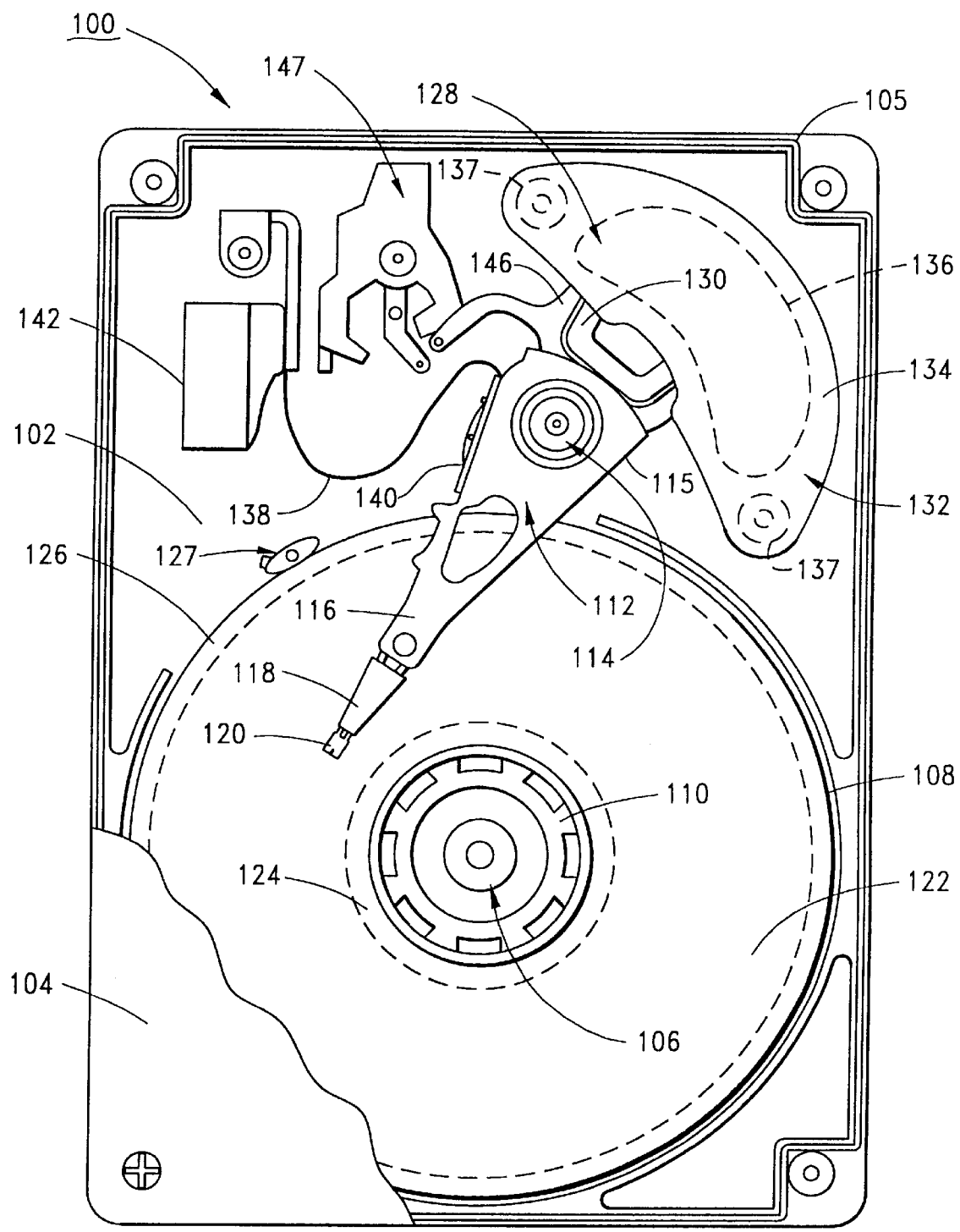
FIG. 1 is a top view of a disc drive constructed in accordance with the present invention.

Referring to the drawings in general, and more particularly to FIG. 1, shown therein is a plan view of a disc drive 100 constructed in accordance with a preferred embodiment of the present invention. The disc drive 100 includes a base deck 102 to which various disc drive components are mounted, and a cover 104 which together with the base deck 102 and a perimeter gasket 105 provide a sealed enclosure for the disc drive 100. The cover 104 is shown in a partial cut-away fashion to expose selected components of interest. It will be understood that numerous details of construction of the disc drive 100 are not included in the following description because they are well known to those skilled in the art and are believed to be unnecessary for the purpose of describing the present invention.

Mounted to the base deck 102 is a spindle motor 106 to which a plurality of discs 108 are mounted and secured by a clamp ring 110 for rotation at a constant high speed. Adjacent the discs 108 is an actuator assembly 112 which rotates about a pivot bearing assembly 114 in a plane parallel to the discs 108. The actuator assembly 112 includes an E-block 115 that is supported by the pivot bearing assembly 114. The E-block 115 has actuator arms 116 (only one shown) that support load arm assemblies 118. The load arm assemblies 118, in turn, support read/write heads 120, with each of the read/write heads 120 adjacent a surface of one of the discs 108 and maintained in a data reading and writing spatial relationship by a conventional slider assembly (not shown) which supports each read/write head 120 in response to air currents generated by the spinning discs 108 during operation of the disc drive 100.

Each of the discs 108 has a data storage location with a data recording surface 122 divided into concentric circular data tracks (not shown), and the read/write heads 120 are positionably located adjacent selected data tracks to read data from or write data to the tracks. The data recording surface 122 is bounded at an inner extent by a circular landing zone 124 where the read/write heads 120 can come to rest against the discs 108 at times when the disc drive 100 is inoperable. The data recording surface 122 is similarly bounded at an outer extent by a circular snubber zone 126 where a snubber 127 selectively contacts the disc 108, as discussed in detail below.

The E-block 115 is positioned by a voice coil motor (VCM) 128, the VCM 128 having an actuator coil 130 supported by the E-block 115 and immersed in a magnetic field generated by a magnet assembly 132. A magnetically permeable flux path, such as provided by a pair of steel plates 134 (sometimes referred to as poles 134), completes the magnetic circuit of the VCM 128. In a preferred embodiment shown in FIG. 1, one pole (not shown) is attached to the base deck 102 and the other pole 134 is attached to the cover 104. A pair of magnets 136 are supported about the actuator coil 130, each magnet 136 supported by one of the poles 134. The magnets 136 are maintained in a spatially parallel relationship by attaching each of the poles 134 to a pair of spacers 137, thereby creating a gap between the magnets 136 in which the actuator coil 130 moves.

When controlled current is passed through the actuator coil 130, an electromagnetic field is set up which interacts with the magnetic circuit of the magnet assembly 132 to cause the actuator coil 130 to move relative to the magnets 136 in accordance with the well-known Lorentz relationship. As the actuator coil 130 moves, the E-block 115 pivots about the pivot bearing assembly 114 causing the actuator arms 116 to move the read/write heads 120 adjacent to, and radially across, the discs 108.

To provide the requisite electrical conduction paths between the read/write heads 120 and disc drive read/write circuitry (not shown), head wires (not separately shown) are routed on the actuator assembly 112 from the read/write heads 120, along the load arm assemblies 118 and the actuator arms 116, to a flex circuit 138. The head wires are secured by way of a suitable soldering process to corresponding pads of a printed circuit board (PCB) 140.

The flex circuit 138 is connected to a flex circuit bracket 142 in a conventional manner which, in turn, is connected through the base deck 102 to a disc drive PCB (not shown) mounted to the underside of the base deck 102. The disc drive PCB provides the disc drive read/write circuitry which controls the operation of the read/write heads 120, as well as other interface and control circuitry for the disc drive 100.

Finally, one skilled in the art will recognize the use of a latching assembly 147 that locks the actuator assembly 112 in a parked position when the read/write heads 120 have been moved to the landing zone 124 and the disc drive 100 is inoperable.

Figure 2:
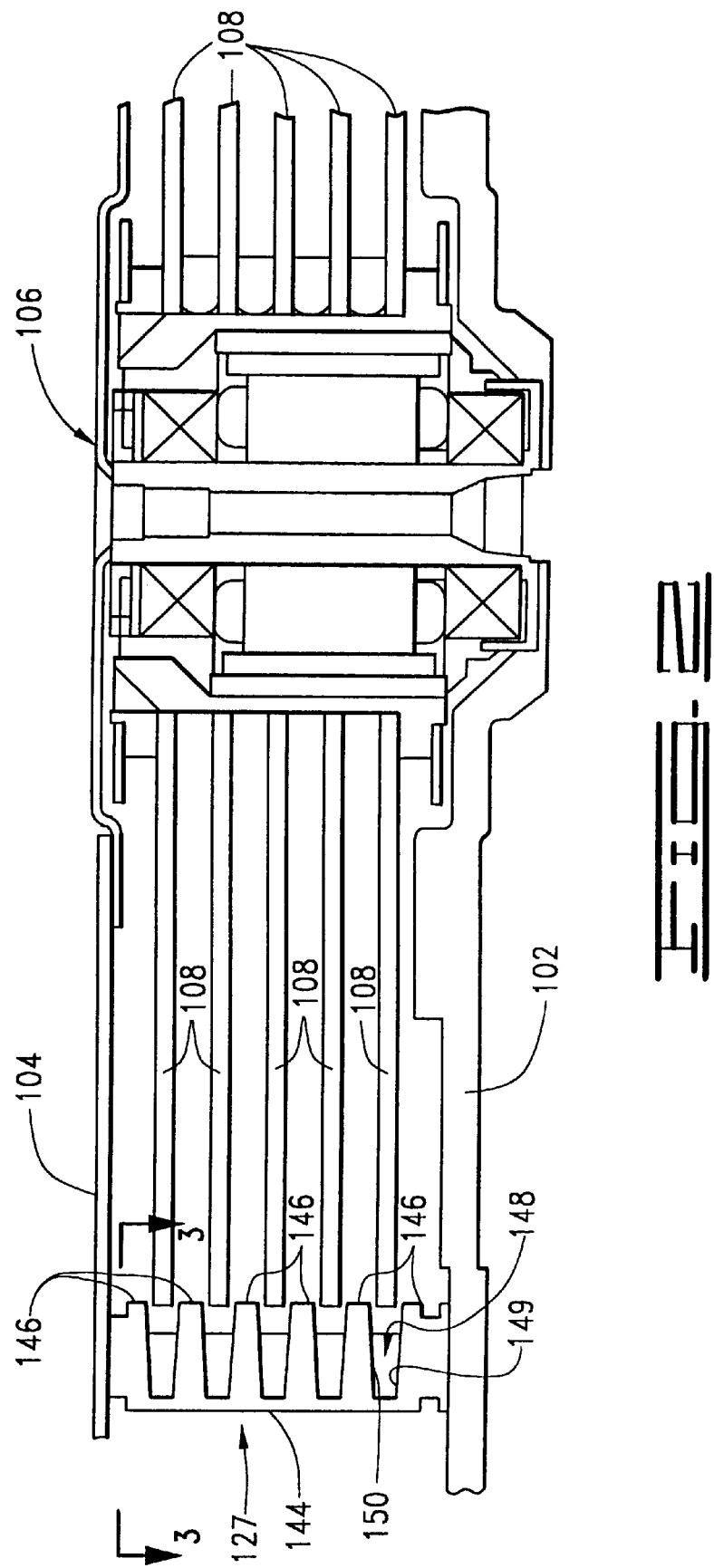
FIG. 2 is a partial side view of the disc drive of FIG. 1, showing the snubber in the open position and thereby disengaging the plurality of data discs.

FIG. 2 is a partial side view of the disc drive 100 of FIG. 1, showing the snubber 127 which has a body 144 supporting a plurality of extending portions 146 that are partially interposed between the discs 108. It will be noted that the extending portions 146 extend above and below the discs 108 only within the non-data storage location of the snubber zone 126. This minimal insertion of the disc 108 within a gap 148 formed by adjacent extending portions 146 permits a certain amount of disc 108 runout or deflection without contacting the snubber 127. A runout or deflection greater than a specified level will cause contact between the extending portions 146 and the snubber zone 126 of the disc 108. This prevents damage to stored data in the data recording surface 122 of the discs 108.

Each of the extending portions 146 have opposed angled surfaces. For example, surface 149 and opposing surface 150 are angled toward each other so that the gap 148 continuously decreases in width along the periphery of the extending portions 146. By rotating the body 144, therefore, the gap 148 width in which the disc 108 is interposed progressively decreases until eventually the surfaces 149, 150 pressingly engage the discs 108, whereat the snubber 127 provides a rigid outboard support for minimal deflection of the peripheral edges of the discs 108.

Figure 3:
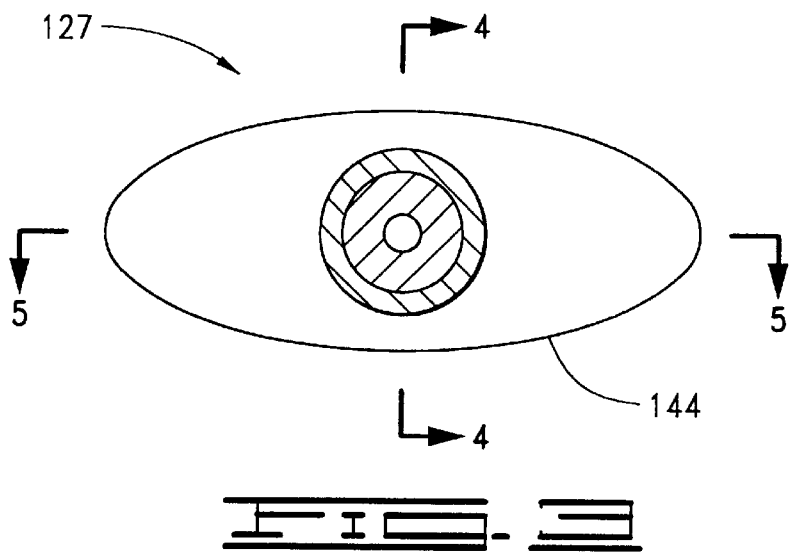
FIG. 3 is a top sectional view of the snubber taken generally along the line 3—3 of FIG. 2.
Figure 4:
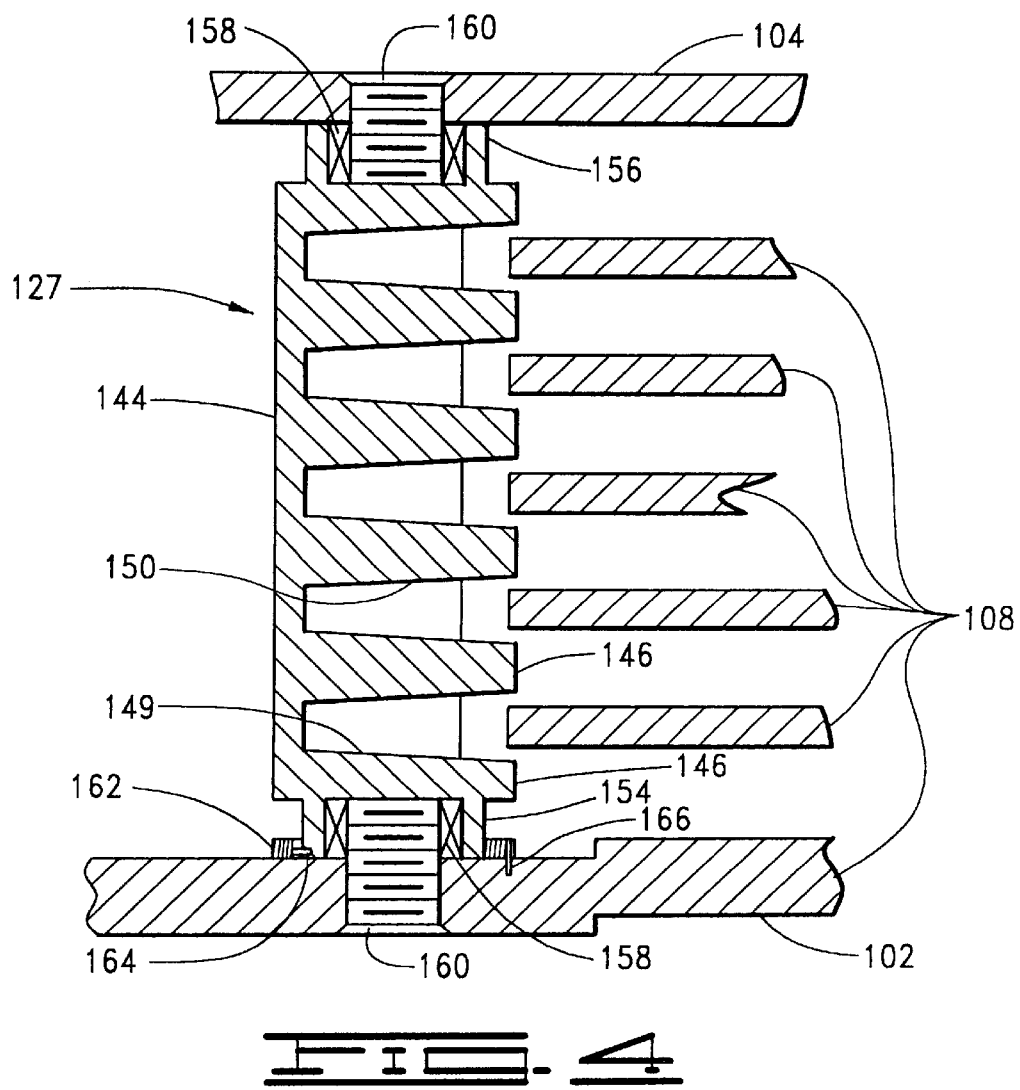
FIG. 4 is a sectional view of the snubber of FIG. 2 in an open position.
Figure 5:
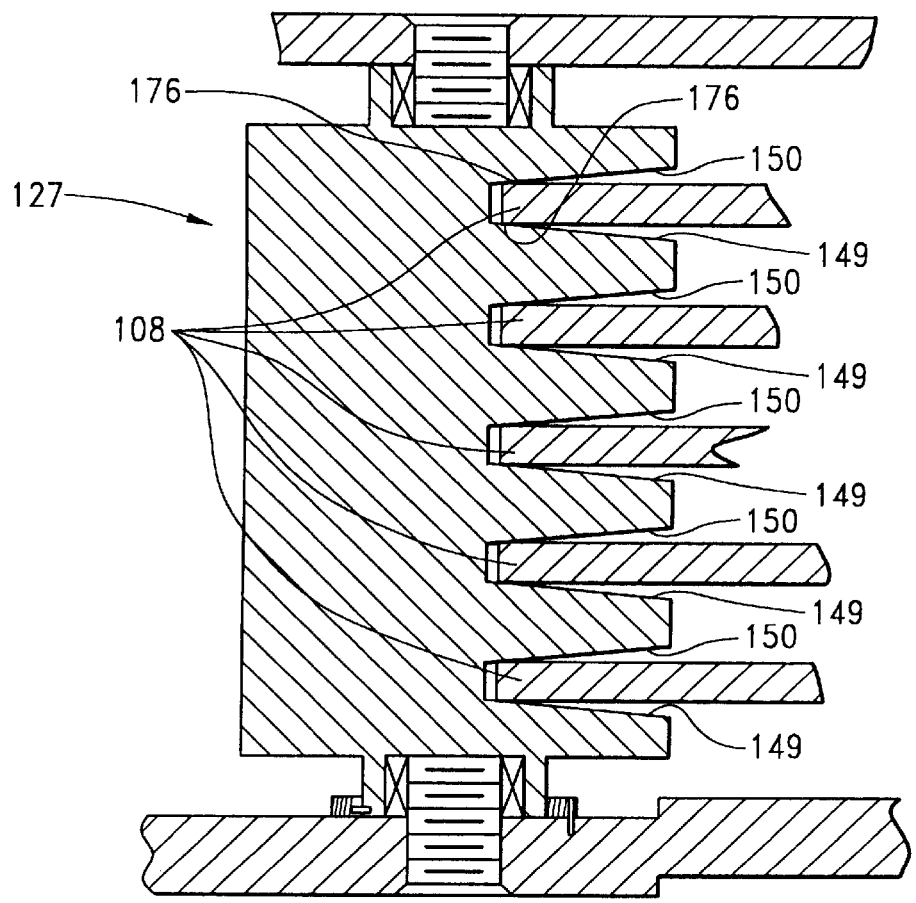
FIG. 5 is a sectional view of the snubber of FIG. 2 in a closed position.

FIG. 3 is a sectional view taken generally along the section line 3—3 of FIG. 2, which illustrates the elliptical shape of the body 144 in a preferred embodiment of the present invention. FIG. 4 provides a partial sectional view of the snubber 127 in the open position and taken generally along a section line 4—4 of FIG. 3. FIG. 5 provides a partial sectional view of the snubber 127 in the closed position and taken generally along the section line 5—5 of FIG. 3.

Turning now to FIG. 4, which provides a detail of the snubber 127 in relation to the discs 108 when the snubber 127 is in the open position, as in FIGS. 1 and 2. It will be noted that the snubber 127 is pivotable about a fixed hub at both ends. In a preferred embodiment the body 144 supports a lower boss 154 and an upper boss 156, each of which receivingly engages a bearing 158, the bearings 158 each being attached to the base deck 102 and cover 104 by a fastener 160. An inner race (not individually shown), therefore, is a hub fixed by the fastener 150 which rollingly engages the bearing 158. In this manner, the body 144 freely pivots about a vertical axis passing through the fasteners 160. A coiled spring 162 is disposed about the lower boss 154, having an inner end 164 attached to the boss 154 and an outer end 166 attached to the base deck 102.

The spring 162 is preloaded to bias the body 144 to a closed position as shown in FIG. 5. It will be noted the unloading of the spring 162 rotates the body 144 so as to bring the angled surfaces 149, 150 into a pressing engagement against the discs 108 for wedging support thereof. The discs 108 are thus fixedly supported to minimize deflection of the edges of the discs 108.

Figure 6:
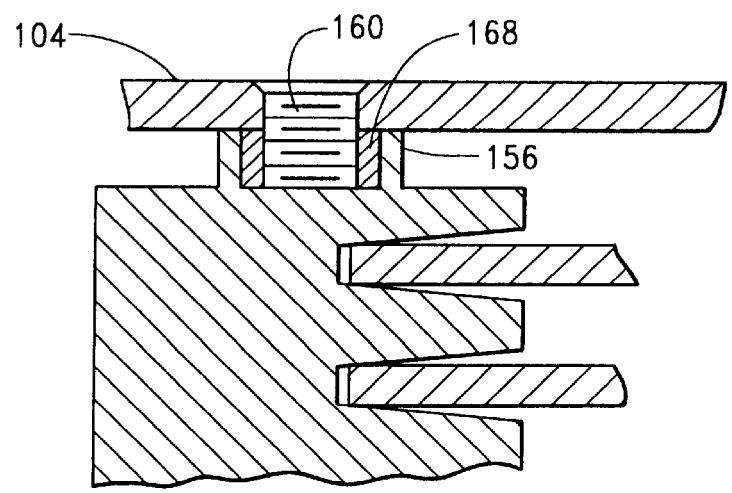
FIG. 6 is a partial sectional view of the snubber of FIG. 2 showing an alternative preferred embodiment in the attachment of the snubber to the disc drive enclosure.

FIG. 6 is a partial sectional view of an alternative preferred embodiment of the present invention wherein the upper boss 156 receivingly engages a hub formed of a cylindrical sleeve 168 that is attached to the cover 104 by the fastener 160. Although not shown, it will be understood the lower boss 154 can likewise engage a sleeve 168 attached to the base deck 102. The preferred embodiment contemplates pivotally supporting the snubber 127 with both the base deck 102 and the cover 104, but an alternative embodiment wherein the snubber 127 can be supported by only the base deck 102 or the cover 104 is an equivalent method of construction to that described herein and as such is within the contemplation of the present invention.

Figure 7:
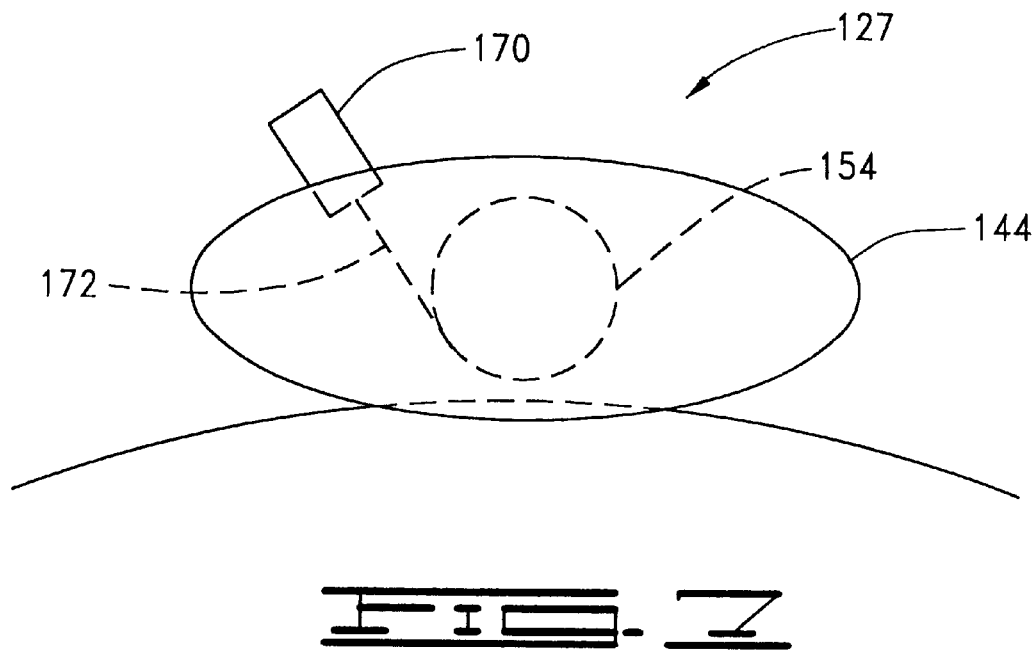
FIG. 7 is a diagrammatic top view of the snubber of FIG. 2 showing the solenoid energized to urge the snubber to the open position.

FIG. 7 is a diagrammatical plan view of the snubber 127, showing the manner in which a conventional solenoid 170 has an internal plunger (not shown) that is displaced linearly when an electrical coil (not shown) is electrically energized. A connecting member 172 is attached between the internal plunger and the lower boss 154 to impart rotation to the body 144 in response to linear movement of the internal plunger. In this manner, electrically energizing the solenoid 170 causes a retraction of the connecting member 172 to rotate the body 144 to the open position.

Figure 8:
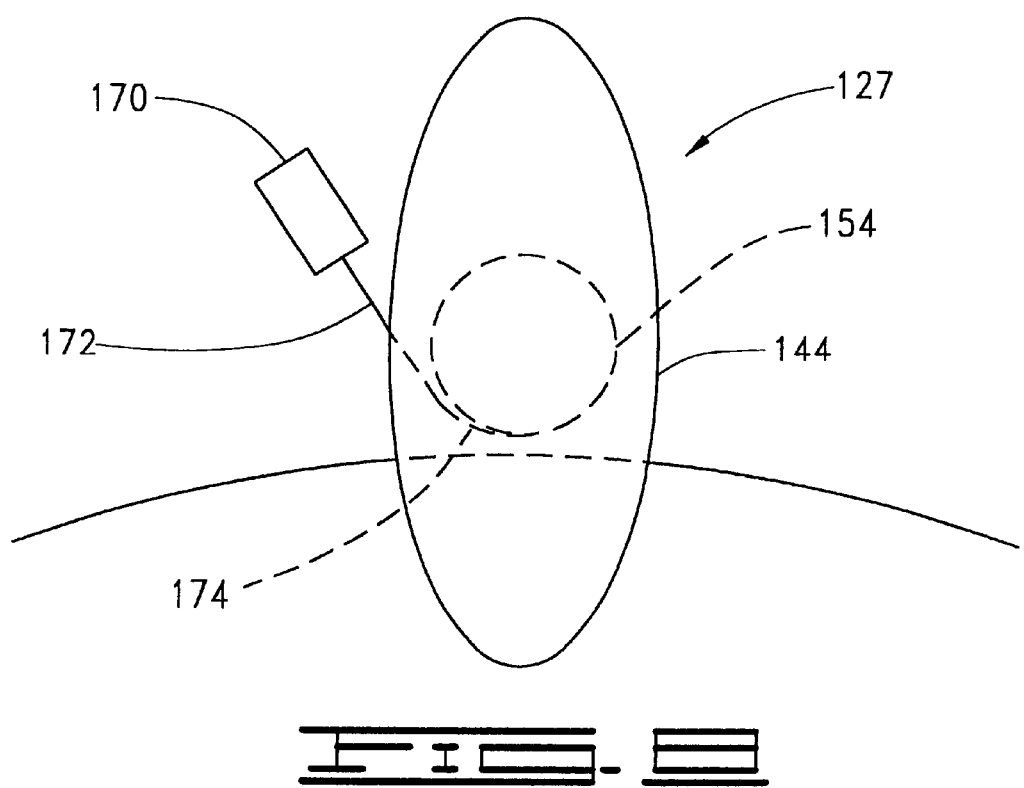
FIG. 8 is a diagrammatic top view of the snubber of FIG. 2 showing the solenoid de-energized to permit the spring member to urge the snubber to the closed position.

It will be noted that rotation of the body to the open position acts in opposition to the spring 162. When the solenoid 170 is de-energized, the spring 162 imparts a recoiling force that urges the body 144 toward the closed position as shown in FIG. 8. The connecting member 172 has a flexible distal end 174 so as to conform to the arcuate characteristic of the lower boss 154, thus maintaining a tangential component of force on the lower boss 154 by the solenoid 170.

In moving to the closed position the body 144 will rotate to a rotational position whereat a frictional engagement exists between the angled surfaces 149, 150 and the discs 108 (see FIG. 5) that is greater than the recoil force provided by the spring 162. Ideally, at this position there is a two-point contact between each disc 108 and the adjacent angled surfaces 149, 150, as is illustrated by the points 176 between the top disc 108 and the snubber 127 of FIG. 5.

A disc 108 that is positioned slightly off-center with respect to the angled surfaces 149, 150 can be urged into alignment by a slight deflection of the disc 108 if the spring 162 is chosen so as to provide a sufficient recoiling force. The spring 162 can be selected to bring all the discs 108 into a two-point abutting engagement by deflections well within the elastic limit of the material used in producing the discs 108.

The body 144 can be formed from a semi-compliant material to aid in accommodating for discs 108 that lie off-center with respect to the gap 148. An elastomeric material more compliant than that of the disc 108 is particularly advantageous.

Although the two-point contact occurs at the outer edge of the disc 108, the extending portions 146 extend radially inward above and below the disc 108. It is advantageous to limit the length of the extending portions 146 to a length that projects above and below only the snubber zone 126. In this manner any deflection of the disc 108 which causes contact with the angled surfaces 149, 150 will not damage data stored in the data storage surfaces 122.

The present invention provides a snubber (such as 127) for a plurality of discs (such as 108) of a disc drive (such as 100) for limiting a deflection of the discs resulting from shocks and vibrations externally imparted to the disc drive.

The snubber has a pivoting body (such as 144) that pivots between a first, or closed, position and a second, or open, position. The pivoting body supports a number of extending portions (such as 146) that include angled surfaces that abuttingly engage the discs in the closed position and which furthermore clearingly disengage the discs 108 in the open position.

A biasing member urges the pivoting body to the closed position, and an actuating member imparts an opposing force that urges the pivoting body to the open position. In a preferred embodiment, the biasing member is a coiled spring (such as 162) that operably engages the pivoting body so as to be wound up as the pivoting body moves to the open position. The actuating member in a preferred embodiment is a solenoid (such as 170) that, when electrically energized, imparts a rotation to the pivoting body in opposition to the spring force.

During operation of the disc drive, the solenoid is energized to place the pivoting body in the open position, where the extending portions clearingly disengage the discs. When the disc drive is non-operational, the solenoid is de-energized so that the spring can rotate the pivoting body so that the extending portions pressingly engage the discs. In a preferred embodiment, the spring force is selected so that each disc is urged into a two point contact with the extending portions, so that each disc is fixedly supported at an outer edge both above and below the disc. In this manner the disc is provided with a fixed support to prevent deflection of the disc at the outer edge in response to external shocks and vibrations.

It is to be understood that even though numerous characteristics and advantages of various embodiments of the present invention have been set forth in the foregoing description, together with details of the structure and function of various embodiments of the invention, this disclosure is illustrative only, and changes may be made in details especially in matters of structure and arrangement of parts within the principles of the present invention to the full extent indicated by the broad general meaning of the terms in which the appended claims are expressed.

What is claimed is:

1. A snubber for a disc drive, comprising:

a body;

an engagement portion depending from the body; and means for operably engaging the engagement portion and a data disc of the disc drive.

* * * * *